United States Patent Office 3,812,109
Patented May 21, 1974

3,812,109
SUBSTITUTED INDENYL GLUCORONIDE ESTERS
Tsung-Ying Shen, Westfield, and Howard Jones, Holmdel,
  N.J., assignors to Merck & Co., Inc., Rahway, N.J.
No Drawing. Filed July 21, 1972, Ser. No. 273,904
Int. Cl. C07d 7/14
U.S. Cl. 260—240 R                            2 Claims

ABSTRACT OF THE DISCLOSURE

New substituted indenyl esters, anhydrides and salts thereof, which have anti-inflammatory, anti-pyretic and analgesic activity. Also included herein are methods of preparing said indenyl esters and anhydrides pharmaceutical compositions having said indenyl esters and anhydrides as an active ingredient and methods of treating inflammation by administering these particular compositions to patients.

SUMMARY OF THE INVENTION

Generally, this invention relates to new substituted indenyl esters, anhydrides and salts thereof and processes for producing the same. This invention also relates to pharmaceutical compositions containing said indenyl acetic acid compounds as an active ingredient and to methods of treating pain, fever or inflammation by administering these particular compositions to patients.

DESCRIPTION AND PREFERRED EMBODIMENTS

This invention relates to new substituted indenyl esters, anhydrides and salts thereof and processes for producing the same. More specifically, this invention relates to compounds having the following general formula:

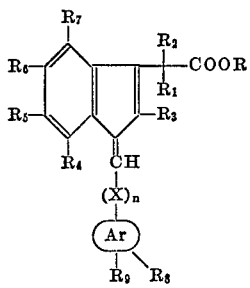

wherein:

$R_1$ and $R_2$ each may be hydrogen, halogen, alkyl, alkenyl, aryl, haloalkyl, alkylthio, arylthio, aralkylthio, amino, alkylamino, dialkylamino, acylamino, N-heterocyclic, keto, hydroxy, alkoxy, alkenyloxy, alkynyloxy, aralkoxy, haloalkoxy, carboxyl, alkoxycarbonyl or aralkoxycarbonyl or $R_1$ and $R_2$ together may be alkylene;

$R_3$ may be hydrogen, alkyl, haloalkyl, alkenyl, alkynyl or trihalomethyl;

$R_4$, $R_5$, $R_6$, $R_7$, $R_8$ and $R_9$ each may be hydrogen, alkyl, acyloxy, aryloxy, alkoxy, nitro, amino, acylamino, alkylamino, dialkylamino, alkenyl, alkynyl, alkenyloxy, dialkylaminoalkyl, sulfamyl, alkylthio, alkylsulfinyl, alkylsulfonyl, hydroxy, hydroxyalkyl, acyl, halo, cyano, carboxyl, carboalkoxy, carbamido, haloalkyl, cycloalkyl, cycloalkyloxy, or aroyl;

X may be alkylene, alkenylene, alkynylene, O, S, carbonyl, sulfinyl, sulfonyl or NR where R can be hydrogen or alkyl;

$n$ may be 0 or 1;

Ar may be aryl or heteroaryl;

R may be $\alpha$- and $\beta$-glucuronide, glyceryl, or Y, wherein Y is:

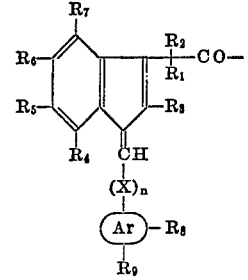

The aryl or heteroaryl substituent in the 1-position of the indene nucleus may include an aryl ring system such as benzene, naphthalene, or biphenyl or a heteroaryl ring system such as a pyrrole, furan, thiophene, pyridine, imidazole, pyrazine, thiazole, etc. and may be substituted with any of the aforementioned $R_6$ and $R_7$ substituents.

In the most preferred compounds of this invention $R_1$ and $R_2$ each may be hydrogen or loweralkyl, $R_3$ is loweralkyl, $R_4$, $R_5$, $R_6$, and $R_7$ each may be hydrogen, halogen, loweralkoxy, lower alkyl, nitro, amino or substituted amino such as dialkylamino, acylamino, alkylamino, etc., $R_8$ is alkylsulfinyl, $R_9$ is hydrogen, X is alkylene or alkenylene, $n$ is 0 or 1, and M is $\alpha$- or $\beta$-glucuronide or Y, and Ar is phenyl. However, the substituents on the indene nucleus are not limited to the preferred class of substituents and includes all those set forth in formula I as well as those which are therapeutically equivalent to those which are specifically enumerated.

Representative compounds of this invention are as follows:

5-fluoro-2-methyl-1-(p-methylsulfinylbenzylidene)-
  indenyl-3-aceto-$\beta$-D-glucopyranoisiduronic acid;
5-fluoro-2-methyl-1-(p-methylsulfinylbenzylidene)-
  indenyl-3-aceto-$\beta$-D-glucopyranoisiduronic acid;
5-methoxy-2-methyl-1-(p-methylsulfinylbenzylidene)-
  indenyl-3-aceto-$\beta$-D-glucopyranoisiduronic acid;
5-chloro-2-methyl-1-(p-methylsulfinylbenzylidene)-
  indenyl-3-aceto-$\beta$-D-glucopyranoisiduronic acid; and
5-fluoro-2-methyl-1-(p-methylsulfinylbenzylidene)-
  indenyl-3-acetic anhydride.

This invention also relates to a method of treating pain, fever or inflammation in patients using a compound of Formula I, particularly an especially preferred compound as the active constituent.

The compounds of the instant invention can be used to treat inflammation by reducing inflammation and relieving pain in such diseases as rheumatoid arthritis, osteoarthritis, gout, infectious arthritis and rheumatic fever. The compounds of Formula I also have anti-pyretic and analgesic activity and would be administered and used in the same manner and in the same dosage ranges as if they were being used to treat inflammation as discussed further on.

The treatment of inflammation in accordance with the method of the present invention is accomplished by topically, orally, rectally or parenterally administering to patients a composition of a compound of Formula I, particularly the especially preferred compounds in a non-toxic pharmaceutically acceptable carrier.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, Cab-O-Sil, and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup, an aqueous solution or a liquid suspension. Suppositories may be prepared in a conventional manner by mixing the compounds of this invention with a suitable non-irritating excipient which is solid at room temperature, but liquid at the rectal temperature. Such materials are cocoa butter and polyethylene glycol. Gels and lotions for topical application may be prepared in conventional manners.

The active compounds of Formula I and of the compositions of this invention are administered in an amount sufficient to treat inflammation, that is to reduce inflammation. Advantageously, the compositions will contain the active ingredient, namely, the compounds of Formula I in an amount of from about 0.1 mg. to 50 mg. per kg. body weight per day (5 mg. to 3.5 g. per patient per day), preferably from about 1 mg. to 15 mg./kg. body weight per day (50 mg. to 1 g. per patient per day).

The method of treatment of this invention comprises administering to a patient (animal or human), a compound of Formula I, particularly an especially preferred compound admixed with a non-toxic pharmaceutical carrier such as exemplified above. The compounds of Formula I and particularly the especially preferred compounds will be administered in an amount of from 0.1 mg. to 50 mg./kg. body weight per day, preferably from about 1 mg. to about 15 mg. per kilogram body weight per day. The most rapid and effective anti-inflammatory effect is obtained from oral administration of a daily dosage of from about 1 to 15 mg./kg./day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of excretion, drug combination, reaction sensitivities and severity of the particular disease.

Example 1.—5 - fluoro - 2 - methyl-1-(p-methylsulfinylbenzylidene) - indenyl - 3-aceto-β-D-glucopyranosiduronic acid Sodium methoxide (25% solution 30 ml.) is added to a stirred solution of 5-fluoro-2-methyl-1-(p-methylsulfinylbenzylidene)-indenyl-3-acetic acid (0.13 M) in tetrahydrofuran (800 ml.). The precipitate is filtered off and dried at 60° under vacuum.

Methyl (tri - O - acetyl - α-D-glucopyranosylbromide)-uronate is made according to a procedure described in J. Amer. Chem. Soc. 77 3310 (1955) or J. Amer. Chem. Soc. 82 2827 (1960).

The dry sodium salt (0.1 M) and the bromopyranoside (0.12 M) are heated in dry dimethyl sulfoxide with stirring at 60° for 2 hours. The product was used as is, the free acid, is a biproduct of the next reaction.

The crude product (13 gm.) is dimethoxyethane (125 ml.) and 2.5 N. hydrochloric acid (62.5 ml.) is heated to 90° for 3 hours. The solution is evaporated at 70° to ½ volume and extracted with methylene chloride (2× 30 ml.). The solution is then saturated with sodium chloride and extracted with methylene chloride again (30 ml.). Then ethyl acetate (2× 50 ml.) and this last extraction washed with water (20 ml.), dried (anhydrous magnesium sulfate) filtered and evaporated to dryness. In this way the glucuronide is isolated from the starting material.

5 - fluoro - 2 - methyl-1-(p-methylsulfinylbenzylidene)-indenyl - 3 - aceto - β-D-glucopyranoisiduronic acid, M.P. 170–172°.

Using the same reaction procedures and techniques, the following glucoronides are obtained in accordance with the procedure of Example 1.

| Starting material | Product |
|---|---|
| 5-chloro-2-methyl-1-(p-methylsulfinylbenzylidene)-indenyl-3-acetic acid. | 5-chloro-2-methyl-1-(p-methylsulfinylbenzylidene)-indenyl-3-aceto-β-D-glucopyranosiduronic acid. |
| 5-methoxy-2-methyl-1-(p-methylsulfinylbenzylidene)-indenyl-3-acetic acid. | 5-methoxy-2-methyl-1-(p-methylsulfinylbenzylidene)-indenyl-3-aceto-β-D-glucopyranosiduronic acid. |
| 5,7-difluoro-2-methyl-1-(p-methylsulfinylbenzylidene)-indenyl-3-acetic acid. | 5,7-difluoro-2-methyl-1-(p-methylsulfinylbenzylidene)-indenyl-3-aceto-β-D-glucopyranosiduronic acid. |
| 5-dimethylamino-2-methyl-1-(p-methylsulfinylbenzylidene)-indenyl-3-acetic acid. | 5-dimethylamino-2-methyl-1-(p-methylsulfinylbenzylidene)-indenyl-3-aceto-β-D-glucopyranosiduronic acid. |

Example 2.—5-fluoro-2-methyl-1-(p-methylsulfinylbenzylidene)-indenyl-3-acetic anhydride A solution of 0.05 m. of N,N'-dicyclohexyl carbodiimide in 60 ml. of tetrahydrofuran is added to 0.05 m. of 5 - fluoro - 2 - methyl-1-(p-methylsulfinylbenzylidene)-indenyl-3-acetic acid in 25 ml. of tetrahydrofuran. The reaction mixture is shaken vigorously at about 25° for 16 hours. The dicyclohexylurea is filtered off and 2 ml. of glacial acetic acid is added to the filtrate. The solution is allowed to stand for 1 hour, filtered and 200 ml. of ether added to the filtrate. The filtrate is then extracted well with water, dried and concentrated. The desired product is purified by column chromatography on silicagel using ether-petroleum ether as an eluent.

What is claimed is:
1. A compound of the formula:

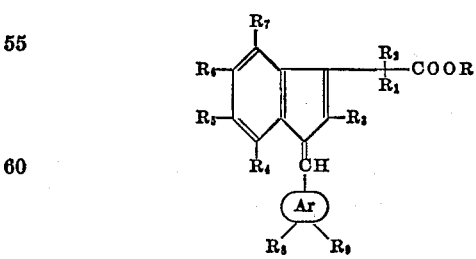

wherein:
$R_1$ and $R_2$ are each hydrogen or loweralkyl;
$R_3$ is loweralkyl;
$R_4$, $R_5$, $R_6$ and $R_7$ are each hydrogen, halogen, loweralkyl, nitro, amino, dimethylamino or methoxy;
$R_8$ is methylsulfinyl;
$R_9$ is hydrogen;
Ar is phenyl; and
R is α- and β-glucuronide.

2. A compound as in claim 1 wherein said compound is 5 - fluoro - 2 - methyl-1-(p-methylsulfinylbenzylidene)-indenyl-3-aceto-β-D-glucopyranosiduronic acid.

References Cited
UNITED STATES PATENTS

| | | | |
|---|---|---|---|
| 3,312,730 | 4/1967 | Winter et al. | 260—473 |
| 3,622,623 | 11/1971 | Shen et al. | 260—515 |
| 3,654,349 | 4/1972 | Shen et al. | 260—515 M |
| 3,692,825 | 9/1972 | Conn | 260—515 A |
| 3,700,730 | 10/1972 | Hinkley | 260—515 A |
| 3,732,292 | 5/1973 | Hinkley et al. | 260—515 A |

JOHN D. RANDOLPH, Primary Examiner

G. T. TODD, Assistant Examiner

U.S. Cl. X.R.

260—465 R, 469, 470, 471 R, 473 F; 424—250, 263, 270, 273, 274, 275, 285, 304, 308, 309